United States Patent [19]

Dieudonne et al.

[11] Patent Number: 5,793,766
[45] Date of Patent: Aug. 11, 1998

[54] MULTIPLEXING PROCESS IN AN ASYNCHRONOUS TRANSFER MODE TELECOMMUNICATION NETWORK AND SWITCHING NODE IMPLEMENTING THE PROCESS

[75] Inventors: Marc Dieudonne, Igny; Jean-Pierre Glon, Bougival, both of France

[73] Assignee: Alcatel Cit, Paris, France

[21] Appl. No.: 664,615

[22] Filed: Jun. 18, 1996

[30] Foreign Application Priority Data

Jun. 19, 1995 [FR] France .................................. 95 07299

[51] Int. Cl.[6] ...................... H04L 12/56; H04J 3/16
[52] U.S. Cl. ............................................ 370/395; 370/473
[58] Field of Search ......................... 370/395, 465, 370/466, 468, 397, 470, 471, 474, 522, 472, 528, 473, 477, 537, 538

[56] References Cited

U.S. PATENT DOCUMENTS

| 4,688,035 | 8/1987 | Gray et al. ................... | 370/471 |
|---|---|---|---|
| 4,761,781 | 8/1988 | Calvignac et al. ............. | 370/465 |
| 4,763,321 | 8/1988 | Calvignac et al. ............. | 370/468 |
| 5,050,166 | 9/1991 | Cantoni et al. ................ | 370/473 |
| 5,287,348 | 2/1994 | Schmidt et al. ................ | 370/395 |
| 5,438,565 | 8/1995 | Hemmady et al. ............. | 370/395 |

OTHER PUBLICATIONS

T. Moors et al, "ATM Receiver Implementation Issues", *IEEE Journal on Selected Areas In Communications*, Feb. 1993, USA, vol. 11, No. 2, ISSN 0733-8716, pp. 254-263.

I. Gard et al, "Supporting STM Traffic with ATM-A Switch Implementation", *ISS '95, World Telecommunications Congress (International Switching Symposium), Advanced Switching Technologies for Universal.*

H. Ueda et al, "SDH Signal Transfer Method Based on ATM Techniques", *Electronics and Communications in Japan, Part I (Communications)*, Jun. 1994, USA, vol. 77, No. 6, ISSN 8756-6621, pp. 1-15.

*Primary Examiner*—Chau Nguyen
*Attorney, Agent, or Firm*—Sughrue, Mion, Zinn, Macpeak & Seas, PLLC

[57] ABSTRACT

A multiplexing process in an asynchronous transfer mode telecommunication network consists in placing a payload in a series of cells supporting the same logical channel a series of data containers supporting the same logical channel, each container including a load that is a quantity of data greater than the payload of each cell. In one preferred embodiment the payload of each container is composite. It includes conventional synchronous digital channel samples and data micropackets each of which has a label indicating a logical channel and the length of the packet. Applications include ATM telecommunication networks.

15 Claims, 5 Drawing Sheets

MULTIPLEXING PROCESS IN AN ASYNCHRONOUS TRANSFER MODE TELECOMMUNICATION NETWORK AND SWITCHING NODE IMPLEMENTING THE PROCESS

BACKGROUND OF THE INVENTION

1. Field of the Invention

The invention concerns a multiplexing process in an asynchronous transfer mode telecommunication network and a switching node using the process.

2. Description of the Prior Art

Broadband integrated services digital networks of the future will be based on the asynchronous transfer mode (ATM), which has been standardized by the CCITT: data is conveyed in packets called cells including a header and a payload of fixed length. The logical path taken by a cell between two nodes of the network is identified by a virtual circuit group identifier and a virtual circuit identifier contained in the header of each cell. Consequently, a source can send cells at its own timing rate, with no direct reference to the network to which the source is connected. These cells can support all kinds of service, requiring only one type of switching within the network: ATM cell switching.

However, the standard cells are not ideally suited to all services. Narrowband telephone services are currently supported by a synchronous network setting up synchronous digital circuits. Samples of thirty telephone signals are grouped together and sent in recurrent frames, each frame being divided into time slots of which thirty are respectively assigned to the thirty telephone circuits. At least during a phase of expansion of asynchronous transfer mode networks, synchronous networks will continue to exist and will even be used as distribution networks for synchronous mode telephone circuits conveyed by cells for the major part of their path. Provisions have therefore had to be made for the two types of network to co-exist.

French patent application No 93 00955 describes a cell assembly device, and a cell disassembly device for synchronous digital channels, that can switch a very large number of synchronous circuits with an ATM type switching network. The cell assembly device places in the same cell, supporting one logical channel, respective samples, representing the signals from a plurality of different synchronous circuits, that can be conveyed by the logical channel. Thus the cell assembly device does not waste time waiting for a plurality of successive samples from the same circuit to fill the cells efficiently. It therefore complies with CCITT Recommendation Q.551 which places an upper limit of one millisecond on the round trip time delay in a synchronous network. The cells are referred to as composite cells.

French patent application No 94 11307 describes a device for switching samples contained in composite cells and also an access node to an asynchronous transfer mode switching network including such devices for switching samples contained in composite cells.

A switching network conventionally comprises a plurality of switching matrix stages, the structure of these stages being optimized to obtain a given probability of blocking for a given traffic, for a given number of inputs and for a cell length defined in the CCITT standard. Conventional calculations are used to choose between a plurality of more or less optimal structures. To optimize the structure further it will be necessary to be able to choose the cell length, but this is not possible since it is standardized. A first object of the invention is therefore to propose a multiplexing process that further optimizes use of a switching network to switch standardized ATM cells.

ATM cells can provide a data transmission service provided that the data to be conveyed is grouped into packets having a length corresponding to the length of the payload of a cell. If the data source operates at a low bit rate, and therefore sends data micropackets, it is often impossible to wait for a plurality of successive micropackets on the same source to fill each cell efficiently. The second object of the invention is therefore to propose a multiplexing process for transmitting data micropackets in standardized ATM cells which are filled efficiently.

SUMMARY OF THE INVENTION

In a first aspect the invention consists of a multiplexing process in an asynchronous transfer mode telecommunication network for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

wherein, before routing data in one of said nodes, a payload is placed in each of a series of cells supporting the same logical channel, a series of logical entities, referred to as data containers, supporting the same logical channel, each container including a load that is a quantity of data greater than that of the payload of each cell, and the quantity of data conveyed by each container being chosen so that the use of said node is more efficient;

wherein, to send samples of a plurality of signals from different circuits and to send data to different destinations, the following are placed in a series of containers supporting a given logical channel and each having a fixed length:

samples respectively corresponding to said circuits, each sample being identifiable within a container by its position in said container; and a plurality of data packets each including a label indicating its length and its destination.

The above process further optimizes the use of each ATM switching node by using an optimal container length for each node. This length is chosen once and for all, on the basis of traffic statistic characteristics, or varies in accordance with current traffic characteristics. It also optimizes cell use by allowing simultaneous conveying of data micropackets (shorter than the payload of a cell) and circuit samples in the same cell, because each circuit sample is identifiable by its position, its length being fixed and known, and each data is micropacket is identifiable by a label that also gives its length.

In a second aspect the invention consists of a switching node implementing the above process, and including:

a first stage including at least one auxiliary switching matrix for grouping into the same logical entity or container data received by said node and contained in different cells, said data being routed over the same path during at least part of their routing in said node, each container being conveyed by a plurality of cells supporting the same logical channel and conveying a quantity of data greater than that of the payload of each cell, the quantity of data conveyed by each container being chosen so that the use of said node is more efficient;

at least one conventional intermediate cell switching stage having inputs coupled to outputs of said first stage;

a final stage including at least one auxiliary switching matrix for placing in separate cells respectively supporting separate logical channels data that has been conveyed in the same cell because it had been grouped in the same container;

at least one auxiliary switching matrix including:

a first marker memory dedicated to routing synchronous circuit samples;

a first space switch controlled by data stored in said first marker memory to place synchronous circuit samples in a cell;

a second marker memory dedicated to routing data packets, and a second space switch controlled by routing data stored in said second marker memory to place data packets in a cell.

In a third aspect, the invention consists of a switching node including:

a main cell switching network having main inputs constituting the inputs of said node and main outputs constituting the outputs of said node; and at least one auxiliary cell switching network having inputs respectively connected to auxiliary outputs of said main network and outputs respectively connected to auxiliary inputs of said main network, in order to:

group in the same logical entity or container having a capacity greater than the payload of a cell data contained in different cells, said data being routable over the same path for at least part of its routing in said node, and each container being conveyed by a plurality of cells supporting the same logical channel; and place in separate cells supporting respective different logical channels data conveyed in the same cell because it was grouped in the same container; and at least one auxiliary switching matrix including:

a first marker memory dedicated to routing synchronous circuit samples;

a first space switch controlled in accordance with data stored in the first marker memory to place synchronous circuit samples in a cell;

a second marker memory dedicated to routing data packets; and a second space switch controlled in accordance with routing data stored in said second marker memory to place data packets in a cell.

The invention will be better understood and other features will emerge from the following description and the accompanying drawings.

DETAILED DESCRIPTION OF THE PREFERRED EMBODIMENT

Figure 1:
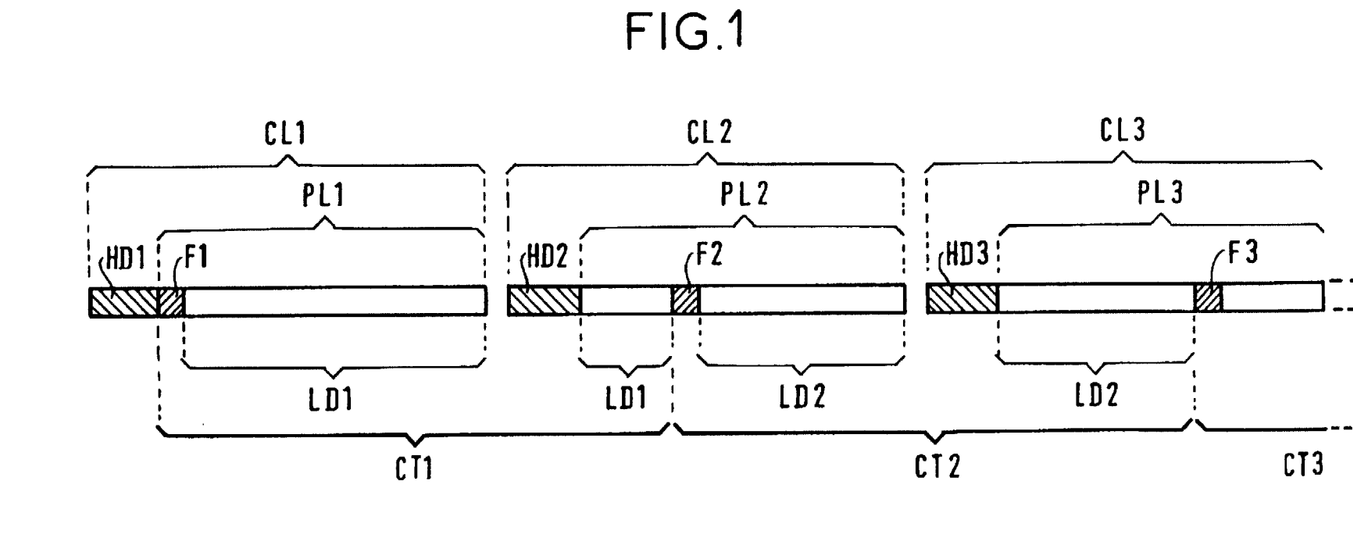
FIG. 1 is a diagram showing a series of data containers placed in a series of cells, the length of the containers not being an integer multiple of the length of a cell.

FIG. 1 illustrates the multiplexing process of the invention by means of an example in which each container has a fixed length between the length of a cell and twice that length. In this example a series of three containers CT1, CT2, CT3 is conveyed by a series of cells CL1, CL2, CL3, etc. Each cell has a respective header HD1, HD2, HD3 containing a virtual circuit group identifier and a virtual circuit identifier. The virtual circuit group identifiers of the cells CL1, etc all identify the same channel. The virtual circuit identifier can differ from one cell to another. Each of the cells also includes its respective payload PL1, PL2, PL3, etc.

The container CT1 straddles the cells CL1, CL2. It includes a load LD1 divided into two parts and has at the start a flag F1 comprising a fixed pattern. The flag F1 and a first part of the load LD1 occupy all of the field intended for the payload PL1 of the cell CL1. A second part of the load LD1 occupies part of the field intended for the payload PL2 of the cell CL2. In this example the flag F1 follows the header HD1 of the cell CL1 immediately, but this is not generally the case since the length of the containers is not an integer multiple of the length of each cell.

The container CT2 includes a flag F2 made up of the same pattern as the flag F1 and that follows on from the second part of the load LD1 in the cell CL2. The flag F2 is followed by a first part of the load LD2, the latter being divided into two parts. The second part of the load LD2 is placed after the header HD3 in the cell CL3. The container CT3 is placed after the second part of the load LD2 in the cell CL3. It begins with a flag F3 identical to the flags F1 and F2.

In this example the length of each container CT1, CT2, CT3, etc is fixed. It is the same for all the inputs of a given switching node. It is determined on the basis of a statistical analysis of the traffic that the node will receive. If these containers support only circuits, conventional calculation methods are used to determine the optimal length of the containers for a given statistically assessed traffic and for a given probability of blocking. If the containers must convey data micropackets or a mixture of data micropackets and telephone circuits, the container size can optimized by simulation.

In one embodiment the length of the containers for a given input of a switching node can vary in time. Container length change protocol primitives are sent in the payload of a container before changing the length.

In another embodiment the containers do not include any flags but instead include an error detection code word analogous to that used in the header of standard ATM cells. This code word is calculated by a standardized algorithm applied to the bits of the header. It is used to detect transmission errors effecting the header. This code word is also used to detect the start of each cell. An existing method of detecting the start and the end of each cell in a continuous stream of standardized cells comprises:

calculating a code word on the fly, using the standardized algorithm;

taking from the received bit stream a word comprising the same number of bits as the code word;

comparing the calculated code word with the received bits and concluding that the header of a cell has been detected if the calculated code word is identical to a word picked out on the fly.

Figure 2:
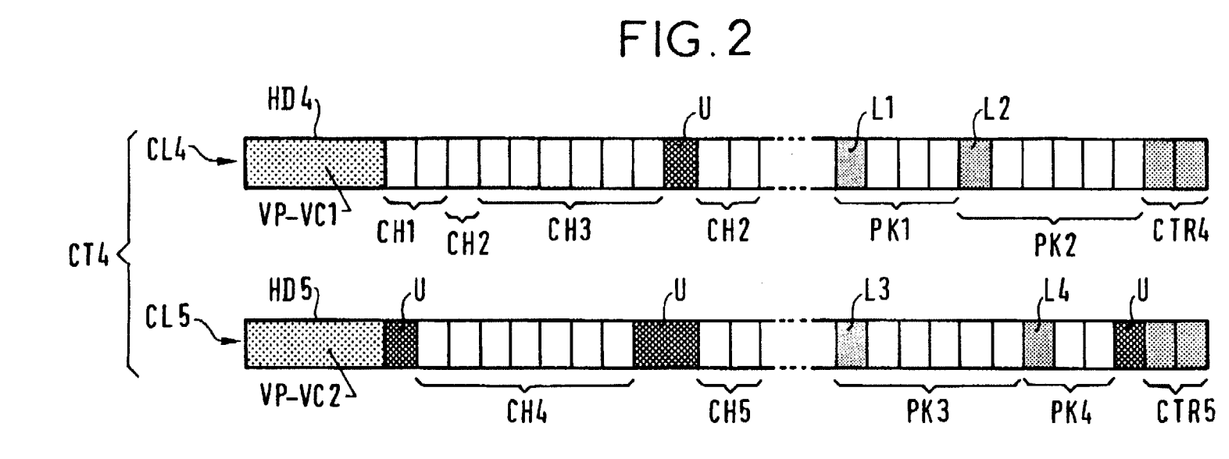
FIGS. 2 and 3 show one particular example of containers each having a length equal to twice the length of a standard cell.
Figure 3:
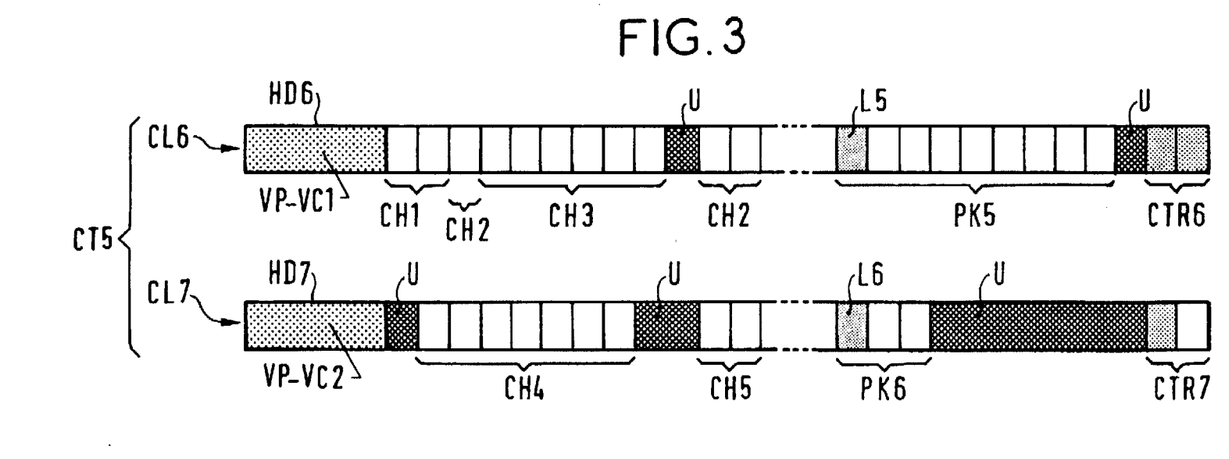

FIGS. 2 and 3 show two containers CT4 and CT5, respectively, in more detail and in an exemplary situation in which each container has a length exactly equal to twice the length of a cell and conveys both telephone circuit samples and data micropackets. In this example the data is in the form of micropackets each of which is shorter than the payload of a cell, enabling circuit samples to be carried in the same cell.

Referring to FIG. 2, the container CT4 is conveyed by a cell CL4 and a cell CL5 having respective headers HD4 and HD5. These headers include the same virtual circuit group identifier VP and different virtual circuit identifiers VC1 and VC2, respectively. The fields marked U in the figures are empty (unused) fields. In this example the cell CL4 conveys a sample from a telephone circuit CH1, a sample from a telephone circuit CH2 which is divided into two parts to use two available but non-contiguous fields, a sample from a telephone circuit CH3; a data micropacket PK1, a data micropacket PK2 and two control bytes CTR4 for detecting errors in the payload of the cell CL4.

In this example no flag is needed to identify the start of each container, since the start is readily identifiable from the header of alternate cells.

The cell CL5 includes a sample from a telephone circuit CH4, a sample from a telephone circuit CL5, a data micropacket PK3, a data micropacket PK4 and two control bytes CTR5 for detecting errors affecting data transmitted in the payload of the cell CL5. Each micropacket includes a respective label L1, L2, L3, L4 comprising a logical reference for routing each micropacket independently and a length indication for precise delimitation of the end of the micropacket.

FIG. 3 shows the container CT5 following the container CT4. It is supported by two successive cells CL6 and CL7 that have respective headers HD6 and HD7. These headers include the same virtual circuit group identifier VP and respective different virtual circuit identifiers VC1 and VC2.

FIG. 3 shows that the containers CT4 and CT5 for each of the respective virtual circuits have exactly the same structure for telephone circuits for as long as those circuits remain set up but a varying structure for data micropackets.

The cell CL6 conveys samples from telephone circuits CH1, CH2, CH3 in exactly the same positions as were occupied by the samples from those circuits in the cell CL4. Similarly, the cell CL7 conveys samples from the telephone circuits CH4 and CH5 at exactly the same positions as were occupied by the samples from the circuits in the cell CL5. However, the cell CL6 conveys a data micropacket PK5 that has a label L5 but is not necessarily the same length as or in the same position as the micropackets PK1 and PK2 in the cell CL4.

It also conveys a control word CTR6 that is conditioned by all of the payload conveyed by the cell CL6.

Similarly, the cell CL7 conveys a micropacket PK6 that is not the same length or in the same position as the micropackets PK3 and PK4 conveyed by the cell CL5. The cell CL7 also conveys a control word CTR7 that is calculated on the basis of all of the payload conveyed by the cell CL7.

In other embodiments, the position of the samples from a given circuit can vary in time to optimize the filling of the cells. Sample position change protocol primitives are then conveyed in these containers.

In this example the data packets to be sent are micropackets very much shorter than a cell, but they could equally well be data packets longer than the payload of a cell, for example 1.5 times the length of a cell, any such packet being divided between a first cell and a second cell constituting the same container.

In a preferred embodiment, all of the circuit samples are grouped into the first part of the container and all of the micropackets are grouped into the second part. The position of the boundary between the two parts of the container is then part of the data defining the structure of the container transmitted by the signaling circuit. This data also includes the position of the samples from each circuit in the container, this position being fixed for the duration of the circuit or variable.

Figure 4:
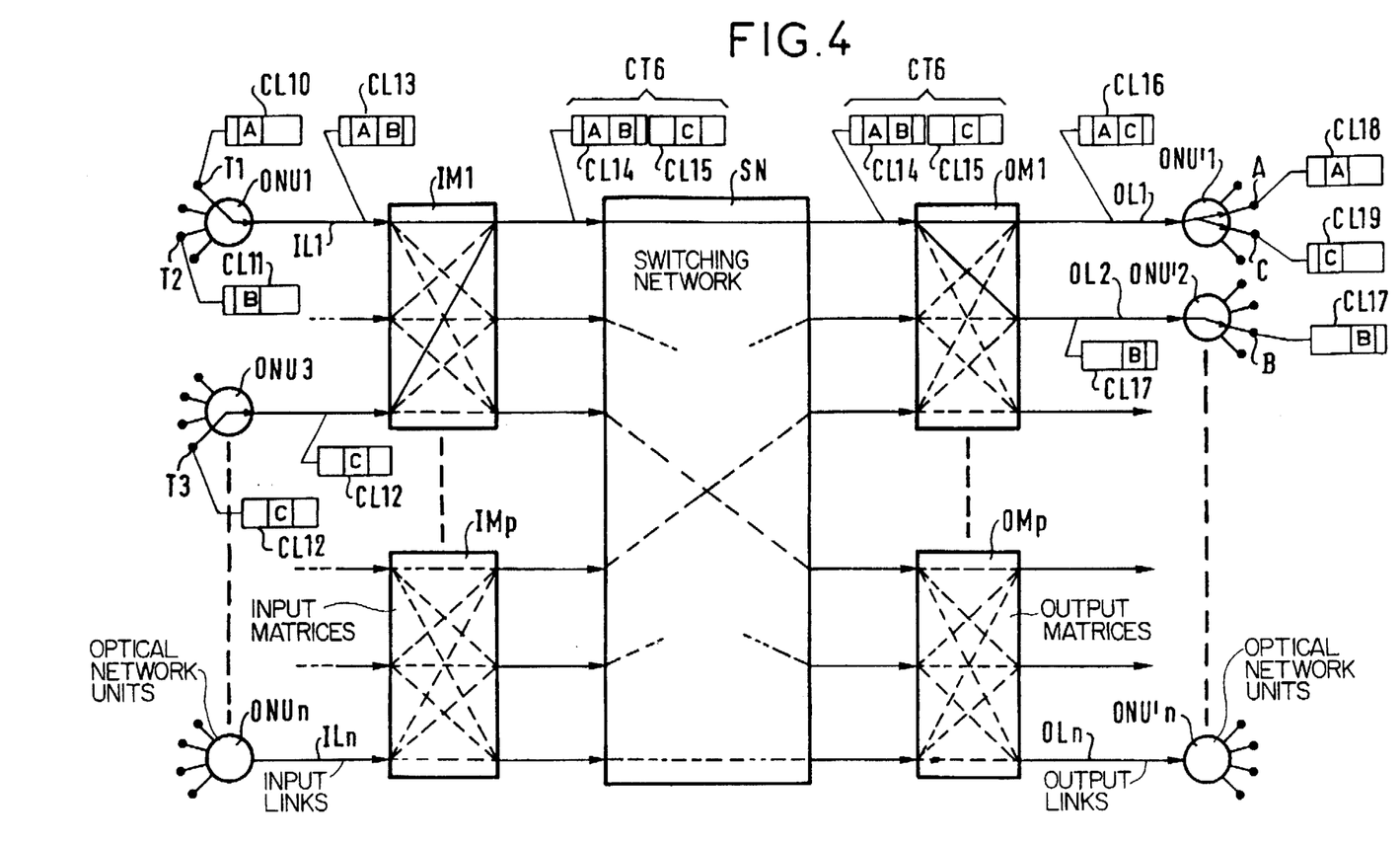
FIG. 4 shows the block diagram of a first embodiment of the switching node of the invention.

FIG. 4 shows a first embodiment of a switching node in accordance with the invention. This embodiment includes:

n input links IL1 through ILn respectively connected to n optical network units ONU1 through ONUn and a output links OL1 through OLn respectively connected to n optical network units ONU'1 through ONU'n, each of these optical network units being connected to one or more user terminals represented by dots in the figure;

p input matrices IM1 through IMp each have three inputs and three outputs in this highly simplified example;

p output matrices OM1 through OMp each having three inputs and three outputs in this highly simplified example;

a conventional ATM switching network SN made up of a plurality of stages (not shown) having n inputs and n outputs.

Each optical network unit ONU1 through ONUn has an output connected to an input of one of the input matrices IM1 through IMp. Each optical network unit ONU'1 through ONU'n has an input connected to an output of one of the output matrices OM1 through OMp. Each output of each input matrix IM1 through IMp is connected to an input of the switching network SN. Each output of the network SN is connected to an input of one of the output matrices OM1 through OMp.

The input matrices IM1 through IMp and the output matrices OM1 through OMp are described below with reference to FIG. 6.

FIG. 4 illustrates the operation of this first embodiment by means of an example in which:

a user terminal T1 connected to the optical network unit ONU1 sends a cell CL10 containing data (telephone circuit samples or data micropackets) addressed to a user terminal A;

a user terminal T2 connected to the optical network ONU1 sends a cell CL11 containing data addressed to a user terminal B; and a user terminal T3 connected to the optical network unit ONU3 sends a cell CL12 containing data addressed to a user terminal C.

The user terminals A and C are both connected to the optical network unit ONU'1 and the user terminal B is connected to an optical network unit ONU'2. The user terminals A, B, C being connected to the same output matrix OM1, it is possible to group in the same container data addressed to these three user terminals, and it is possible to treat this container as a single entity as far as the output matrix OM1. The function of the matrix ON1 is to route differently, i.e. to the respective output links OL1 and OL2, data respectively addressed to the user terminals A and C, on the one hand, and to user terminal B, on the other hand. The function of the switching network SN is to route the containers, each comprising two cells in this example, by routing each of the two cells individually on the same path, without knowing that the two cells constitute a container.

In this example the optical network unit ONU1 forms a composite cell CL13 containing the data addressed to A and the data addressed to B. The optical network unit ONU3 forwards the cell CL12 without modifying its payload. The input matrix IM1 forms a container CT6 made up of two consecutive cells CL14 and CL15, placing therein all the data that has to pass through the output matrix OM1 before reaching its respective destination. The data addressed to A, B, C is therefore placed in the container CT6. The network SN routes the two cells CL14 and CL15 to any output of the network SN connected to an input of the matrix OM1.

The matrix OM1 splits up the container CT6 and places the data that it contains in two cells CL16 and CL17 respectively addressed to the optical network units ONU'1 and ONU'2. The cell CL16 is a composite cell containing data addressed to A and data addressed to B. The cell CL17 is a cell containing only data addressed, to C. The optical network unit ONU'2 forwards the cell CL17 to the user terminal B without modifying its payload. The terminal ONU'1 divides the composite cell CL16 into two cells CL18 and CL19 respectively containing only the data addressed to A and only the data addressed to C.

Figure 5:
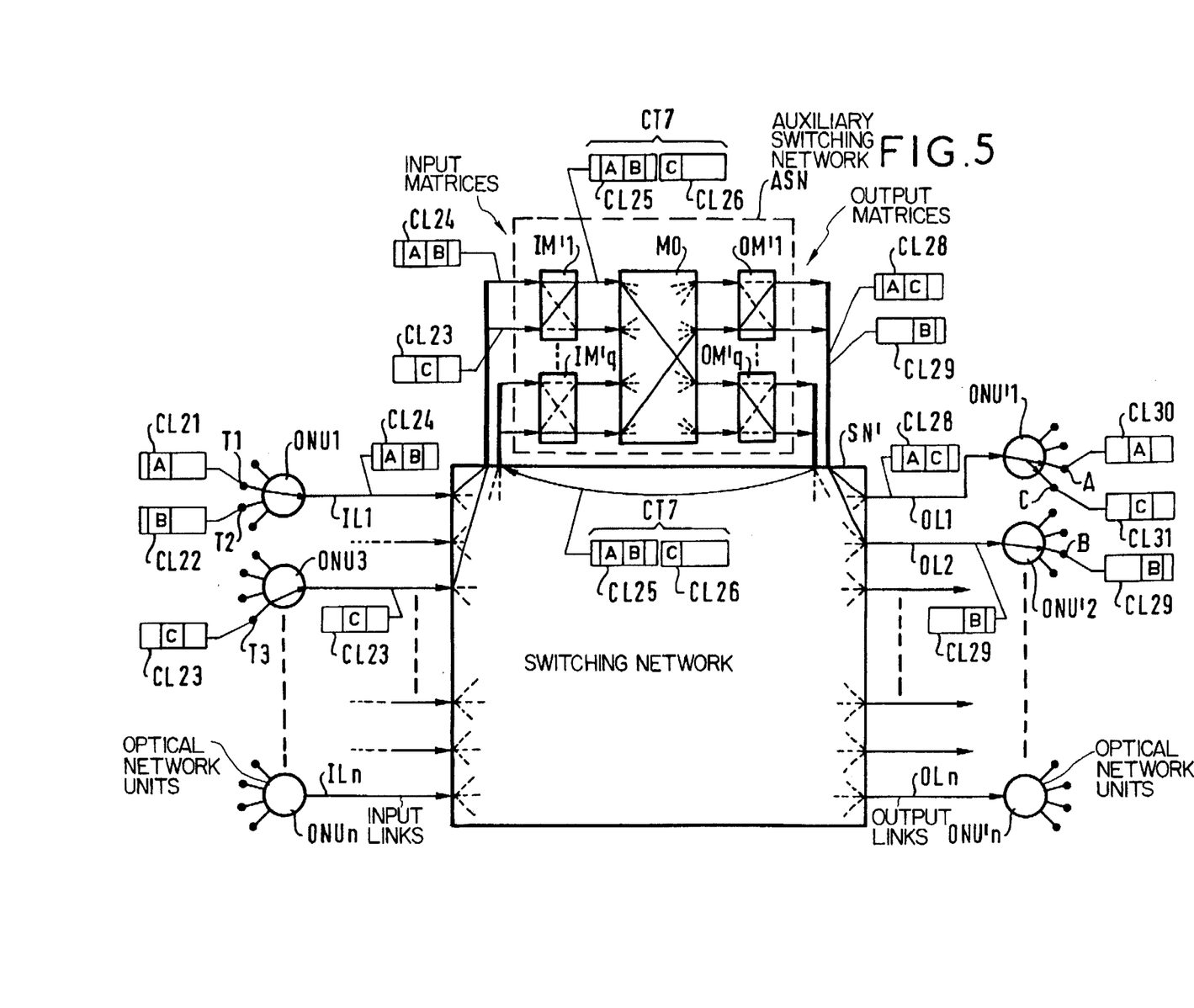
FIG. 5 shows the block diagram of a second embodiment of the switching node of the invention.

FIG. 5 shows the block diagram of a second embodiment of a switching node in accordance with the invention. This second embodiment includes:

n input links IL1 through ILn connected to optical network units ONU1 through ONUn and n output links OL1 through OLn respectively connected to n optical network units ONU'1 through ONU'n;

a conventional ATM switching network SN' having n main inputs, n main outputs, n auxiliary inputs and n auxiliary outputs;

an auxiliary ATM switching network ASN having n inputs respectively connected to the n auxiliary outputs of the network SN' and n outputs respectively connected to the n auxiliary inputs of the network SN'.

In this example the auxiliary network ASN includes:

a conventional ATM switching matrix M0 having n inputs and n outputs;

q input matrices IM'1 through IM'q each having two inputs and two outputs in this simplified example;

q output matrices OM'1 through OM'q each having two inputs and two outputs in this simplified example.

The inputs of the matrices IM'1 through IM'q constitute the n inputs of the network ASN. Their outputs are respectively connected to the n inputs of the matrix M0. The n outputs of the matrix M0 are respectively connected to the inputs of the output matrices OM'1 through OM'q. The outputs of these output matrices respectively constitute the n outputs of the network ASN. The input matrices IM'1 through IM'q and the output matrices OM'1 through OM'q are described below with reference to FIG. 6.

FIG. 5 illustrates the operation of this second embodiment with reference to the situation in which:

a user terminal T1 connected to the optical network unit ONU1 sends a cell CL21 containing data addressed to a user terminal A;

a user terminal T2 connected to the optical network unit ONU1 sends a cell CL22 containing data addressed to a user terminal B; and a user terminal T3 connected to the optical network unit ONU3 sends a cell CL23 containing data addressed to a user terminal C.

The user terminals A and C are connected to the same optical network ONU'1 and the user terminal B is connected to the optical network unit ONU'2. The data addressed to A, B and C can be grouped together in the same container over most of the path, the network SN' dividing up the container at the latest possible time and routing the data to the respective destinations.

The optical network unit ONU1 forms a composite cell CL24 by grouping the data addressed to the user terminals A and B. The optical network unit ONU3 forwards the cell CL23 without modifying its payload. The network SN' is employed a first time to route the cells CL24 and CL23 to two inputs of the auxiliary network ASN, these two inputs corresponding to the same input matrix IM'1, to enable the latter to form a container CT7 containing both data to pass through the optical network unit ONU'1 and data to pass through the optical network unit ONU'2. The container CT7 is made up of two consecutive cells CL25 and CL26. The cell CL25 conveys data addressed to terminal A and data addressed to terminal B. The cell CL26 conveys data addressed to terminal C. The cell CL25 conveys data addressed to terminal A and data addressed to terminal B. The cell CL26 conveys data addressed to terminal C. The container CT7 is routed by the matrix M0 and an output matrix (for example OM'q) as far as an auxiliary input of the network SN'. The latter is then employed a second time to route is the two cells CL25 and CL26 constituting the container CT7 in exactly the same way to an auxiliary output of the network SN' that is connected to an input of the corresponding auxiliary network ASN, for example, to the input matrix IM'q.

The matrix IM'q and the matrix M0 route the container to an output matrix OM'1 which has the task of dividing the container CT7 into two cells CL28 and CL29 to pass through the respective optical network units ONU'1 and ONU'2. The cell CL28 is a composite cell that contains the data addressed to A and the data addressed to C. The cell CL29 contains the data addressed to B. The network SN' is then used a third time to route these two cells to respective links OL1 and OL2 that route them to the respective optical network units ONU'1 and ONU'2. The unit ONU'1 divides the composite cell CL28 into two cells CL30 and CL31 respectively containing only the data addressed to A and only the data addressed to C. The unit ONU'2 forwards the cell CL29 to the user terminal B without modifying its payload.

Note that the data addressed to A, B, C passes through the network SN' three times, whereas in the FIG. 4 embodiment it passed through it only once. The second embodiment therefore consumes more switching resources. However, the second embodiment has the advantage of being more reliable since the structure of the network ASN, which is to some degree in parallel with the structure of the network SN', can remedy certain faults occurring in the network ASN, whereas in the first embodiment it is not possible to remedy a fault occurring in any of the input matrices IM1 through IMp or in any of the output matrices OM1 through OMp.

Figure 6:
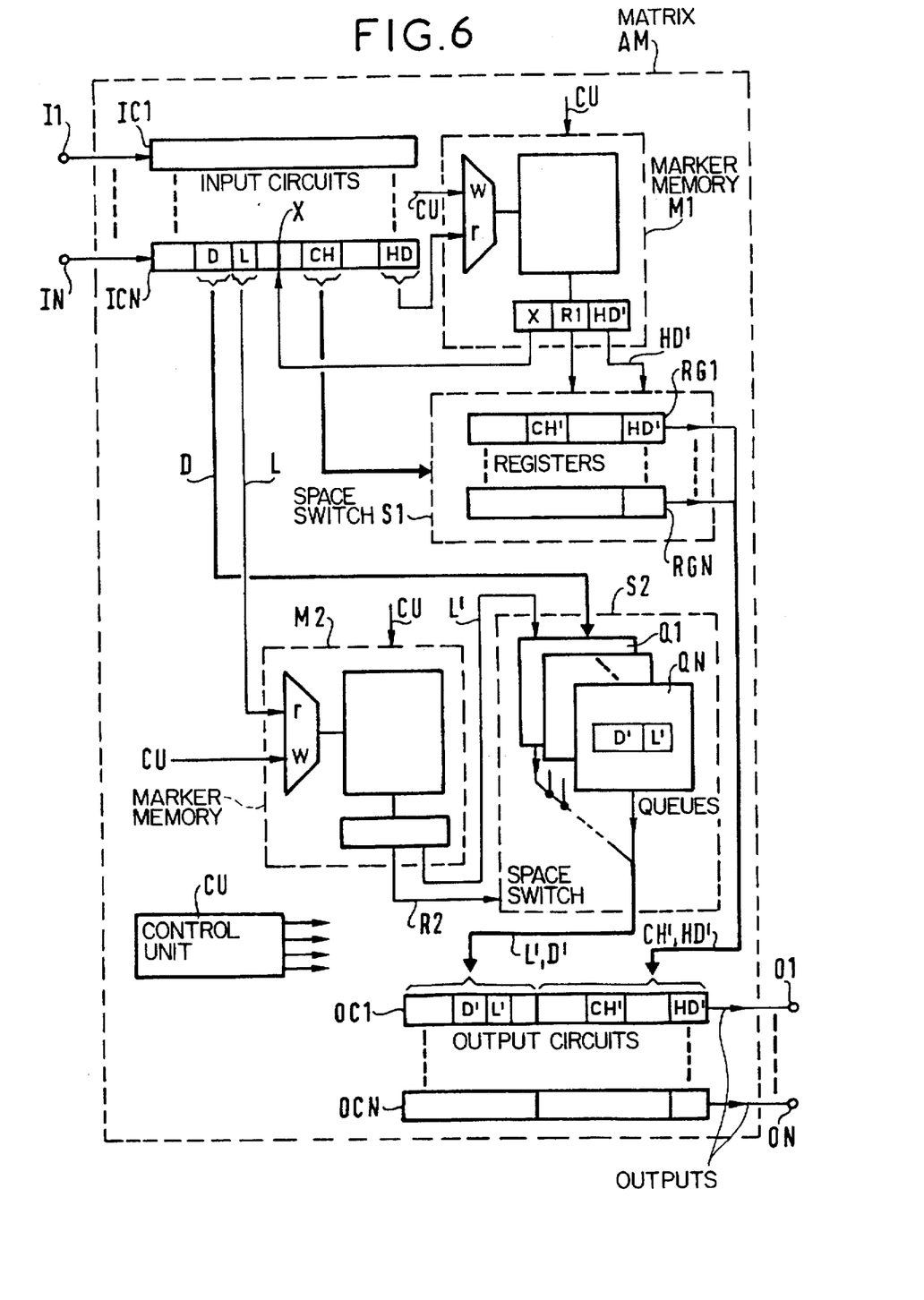
FIG. 6 shows a switching matrix that can be used in both these embodiments.

FIG. 6 shows the block diagram of a matrix AM that can constitute any of the matrices IM1 through IMp, OM1 through OMp, IM'1 through IM'q and OM'1 through OM'q used in the embodiments shown in FIGS. 4 and 5. This matrix AM includes:

N inputs I1 through IN;

N input circuits IC1 through ICN each having a respective input connected to one of the inputs I1 through IN;

a first marker memory M1 dedicated to routing synchronous telephone circuit samples;

a first space switch S1 dedicated to the synchronous telephone circuit samples;

a second marker memory M2 dedicated to routing data micropackets;

a second space switch S2 dedicated to the data micropackets;

N output circuits OC1 through OCN;

N outputs O1 through ON each connected to a respective output of one of the output circuits OC1 through OCN; and a control unit CU controlling each of the subsystems of the matrix AM.

Each input circuit IC1 through ICN includes a register for storing a cell received at a respective input terminal I1 through IN. The cell is received serially and is written into memory under the control of a clock signal (not shown) supplied by the control unit CU.

The marker memory M1 has a write address input coupled to an output of the control unit CU and a read address input coupled to an output of each of the input circuits IC1 through ICN to receive a cell header HD. A data input of the memory M1 is connected to an output of the control unit CU. The content of the marker memory M1 is supplied by the control unit CU and is written under the control of the control unit CU during call set-up.

Each logical channel terminating at one of the inputs I1 through IN is identified by a virtual circuit group identifier and a virtual circuit identifier contained in the header HD of each cell supporting that logical channel. For each incoming logical channel the marker memory M1 contains, on the same line:

- the identifiers of the synchronous telephone circuits conveyed by the incoming logic channels, these identifiers indicating the positions of these samples in an incoming cell;
- the identifier of an outgoing logical channel, the identifier of an output O1 through ON and identifiers indicating the positions allocated to the telephone circuit samples in each outgoing cell supporting the logical channel; and
- an indication of the position X beyond which the content of an incoming cell conveys data micropackets, each cell having a first part containing only synchronous telephone circuit samples and a second part containing only data micropackets, this position varying from one cell to another.

This data is supplied to the control unit CU by signaling links that are not shown.

A first data output of the memory M1 is connected to a common input of the input circuits IC1 through ICN to supply to the latter the indication X of the position beyond which the payload of a cell conveys micropackets. A second data output of the memory M1 is connected to a control input of the space switch S1 to supply to the latter routing data RI made up of the identity of one of the outputs O1 through ON of the matrix AM and identifiers that identify the positions of the synchronous telephone circuit samples in each cell on the outgoing logical channel. A third data output of the memory M1 is connected to an input of the space switch S1 to supply to the latter a header HD' essentially made up of the identifiers of the outgoing logical channel.

The switch S1 has N registers RG1 through RGN for respectively storing the part of a cell dedicated to the synchronous telephone circuit samples for the N outputs O1 through ON, respectively, and for storing the header HD' of each cell that will convey those samples. The task of the space switch S1 is to switch to one of the output circuits OC1 through OCN the synchronous telephone circuit samples contained in the first part of each of the incoming cells.

Each incoming cell is stored in memory in one of the input circuits IC1 through ICN for sufficient time to switch the data that it contains. The content of the header HD of each cell received is supplied by the input circuit to the read address input of the marker memory M1. Reading the marker memory M1 at this address supplies the routing data R1 to the control input of the space switch S1 so that it stores in each of the registers RG1 through RGN samples addressed to the output circuits OC1 through OCN, respectively. They are stored in these registers at positions corresponding to those that they will occupy in an outgoing cell. Reading the memory M1 also supplies the header HD' of an outgoing cell. This header is also stored in one of the registers RG1 through RGN. The content of each register RG1 through RGN is then transferred to one of the output circuits OC1 through OCN which inserts it into an outgoing cell.

The marker memory M1 also supplies the input circuit IC1 through ICN with the indication X of the position beyond which the content of the incoming cell conveys data micropackets. Thus each input circuit IC1 through ICN knows the position X from which it can start to read data micropackets.

The marker memory M2 is dedicated to routing these micropackets. It has a data input connected to an output of the control unit CU, a write address input connected to an output of the control unit CU, a read address input connected to a common output of the input circuits IC1 through ICN and two data outputs respectively connected to two inputs of the space switch S2. The marker memory M2 contains routing data R2 consisting of an identity that identifies one of the outputs O1 through ON of the matrix AM and contains a new label L' for each data micropacket.

One output of the input circuits IC1 through ICN is connected to an input of the space switch S2 to supply to the latter the data D contained in each data micropacket. Another output of the input circuits IC1 through ICN is connected to a read address input of the marker memory M2 to supply to the latter the label L of each data micropacket. When a data micropacket is read in an input circuit, the marker memory M2 is read at the address L. An output of the marker memory M2 supplies a new label L' for that data packet to an input of the space switch S2. The latter stores each data micropacket, made up of a new label L' and the data D, in a queue Q1 through QN respectively corresponding to one of the output circuits OC1 through OCN. These queues Q1 through QN are used to resolve contention problems due to the asynchronous arrival of data micropackets address to the same output O1 through ON. These queues are managed in a conventional way.

The output of each queue Q1 through QN of the space switch S2 is connected to a respective input of an output circuit OC1 through OCN to supply to the latter, data micropackets each made up of a new label L' and data D. Reading of the output circuits OC1 through OCN is commanded periodically by the control circuit CU over a link that is not shown. The cell read in each output circuit in this way is fed serially to the output O1 through ON corresponding to that output circuit.

There is claimed:

1. A multiplexing process, in an asynchronous transfer mode telecommunication network, for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

said process comprising the steps of:

before routing data in one of said nodes, placing a payload in each of a series of cells supporting a same logical channel, wherein a series of logical entities, referred to as data containers, support the same logical channel, each container including a load that is a quantity of data greater than that of the payload of each cell; and choosing a quantity of data conveyed by each container so that the use of said one node is more efficient; and to send data to different destinations, placing a plurality of data packets in the series of containers supporting the same logical channel:

each of said plurality of data packets including a label containing a logical reference and indicating the length of the packet.

2. The multiplexing process according to claim 1, further comprising the step of, to further send samples of a plurality of signals from different circuits to different destinations, placing samples in a series of containers supporting a given logical channel, said samples respectively corresponding to said circuits, and each sample being identifiable within a container by its position in said container.

3. Process according to claim 1 wherein the position of all the samples from a given circuit is fixed for the entire duration of said circuit.

4. Process according to claim 2 wherein the position of the samples from a given circuit is variable for the duration of said circuit and sample position change protocol primitives are conveyed in containers.

5. Process according to claim 1 wherein the start of each container is identified by a predetermined flag.

6. Process according to claim 1 wherein the length of said containers transmitted over a given link is able to vary and container length change protocol primitives are transmitted in the payload of a container before any change of length is effected.

7. A switching node for implementing a multiplexing process, in an asynchronous transfer mode telecommunication network, for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

said process comprising the steps of:

before routing data in one of said nodes, placing a payload in each of a series of cells supporting a same logical channel, wherein a series of logical entities, referred to as data containers, supports the same logical channel, each container including a load that is a quantity of data greater than that of the payload of each cell; and choosing a quantity of data conveyed by each container so that the use of said one node is more efficient; and to send data to different destinations, placing a plurality of data packets in the series of containers supporting the same logical channel, each packet including a label containing a logical reference and indicating the length of the packet;

said switching node comprising:

a first stage including at least one first auxiliary switching matrix for grouping into the same container, data received by said node and contained in different cells, said received data being routed over the same path during at least part of their routing in said node, each container being conveyed by the series of cells supporting the same logical channel and conveying the quantity of data greater than that of the payload of each cell;

at least one conventional intermediate cell switching stage having inputs coupled to outputs of said first stage;

a final stage including at least one second auxiliary switching matrix for placing, in separate cells respectively supporting separate logical channels, data that has been conveyed in the same cell because it had been grouped in the same container; and each said auxiliary switching matrix comprising:

a first marker memory dedicated to routing data packets; and a first space switch controlled by routing data stored in said first marker memory to place data packets in a cell.

8. The switching node according to claim 7, wherein at least one auxiliary switching matrix further comprises:

a second marker memory dedicated to routing synchronous circuit samples; and a second space switch controlled by data stored in said first marker memory to place synchronous circuit samples in a cell.

9. The switching node according to claim 8, further comprising:

for optimizing resources within a container to be sent, means for assigning each circuit sample a position in said container, modifying the content of the second marker memory accordingly and placing circuit sample position change protocol primitives in said container for all the circuits set up; and means for, on receipt of a container, interpreting primitives conveyed by said container and indicating position changes, to determine the positions of the samples conveyed in said container, and updating accordingly said second marker memory.

10. A switching node for implementing a multiplexing process, in an asynchronous transfer mode telecommunication network, for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

said process comprising the steps of:

before routing data in one of said nodes, placing a payload in each of a series of cells supporting a same logical channel, wherein a series of logical entities, referred to as data containers, supports the same logical channel, each container including a load that is a quantity of data greater than that of the payload of each cell; and choosing a quantity of data conveyed by each container so that the use of said one node is more efficient; and to send samples of a plurality of signals from different circuits and to send data to different destinations, placing the following items in the series of containers supporting the same logical channel, each container having a fixed length:

samples respectively corresponding to said circuits, each sample being identifiable within a container by its position in said container; and a plurality of data packets each including a label indicating its length and its destination;

said switching node comprising:

a main cell switching network having main inputs, constituting the inputs of said node, and main outputs constituting the outputs of said node; and at least one auxiliary cell switching network having inputs, respectively connected to auxiliary outputs of said main network, and outputs respectively connected to auxiliary inputs of said main network, in order to:

group in the same container, having a capacity greater than the payload of a cell, data contained in different cells, said data being routable over the same path for at least part of its routing in said node, and each container being conveyed by the series of cells supporting the same logical channel; and place in separate cells, supporting respective different logical channels, data conveyed in the same cell because it was grouped in the same container; and said at least one auxiliary switching matrix comprising:

a first marker memory dedicated to routing data packets; and a first space switch controlled in accordance with routing data stored in said second marker memory to place data packets in a cell.

11. The switching node according to claim 10, wherein at least one auxiliary switching matrix further comprises:

a second marker memory dedicated to routing synchronous circuit samples; and a second space switch controlled in accordance with data stored in the first marker memory to place synchronous circuit samples in a cell.

12. The switching node according to claim 11, further comprising:

for optimizing resources within a container to be sent, means for assigning each circuit sample a position in said container, modifying the content of the second marker memory accordingly and placing circuit sample position change protocol primitives in said container for all the circuits set up; and means for, on receipt of a container, interpreting primitives conveyed by said container and indicating position changes, to determine the positions of the samples conveyed in said container, and updating accordingly said second marker memory.

13. A switching node for implementing a multiplexing process, in an asynchronous transfer mode telecommunication network, for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

said process comprising the steps of:

before routing data in one of said nodes, placing a payload in each of a series of cells supporting a same logical channel, wherein a series of logical entities, referred to as data containers, supports the same logical channel, each container including a load that is a quantity of data greater than that of the payload of each cell; and choosing a quantity of data conveyed by each container so that the use of said one node is more efficient; and to send samples of a plurality of signals from different circuits and to send data to different destinations, placing the following items in the series of containers supporting the same logical channel, each container having a fixed length:

samples respectively corresponding to said circuits, each sample being identifiable within a container by its position in said container; and a plurality of data packets each including a label indicating its length and its destination; said switching node comprising:

a first stage including at least one first auxiliary switching matrix for grouping into the same container, data received by said node and contained in different cells, said received data being routed over the same path during at least part of their routing in said node, each container being conveyed by the series of cells supporting the same logical channel and conveying the quantity of data greater than that of the payload of each cell;

at least one conventional intermediate cell switching stage having inputs coupled to outputs of said first stage;

a final stage including at least one second auxiliary switching matrix for placing, in separate cells respectively supporting separate logical channels, data that has been conveyed in the same cell because it had been grouped in the same container; and each said auxiliary switching matrix comprising:

a first marker memory dedicated to routing synchronous circuit samples;

a first space switch controlled by data stored in said first marker memory to place synchronous circuit samples in a cell;

a second marker memory dedicated to routing data packets; and a second space switch controlled by routing data stored in said first marker memory to place data packets in a cell.

14. The switching node according to claim 13, further comprising:

for optimizing resources within a container to be sent, means for assigning each circuit sample a position in said container, modifying the content of the first marker memory accordingly and placing circuit sample position change protocol primitives in said container for all the circuits set up, and means for, on receipt of a container, interpreting primitives conveyed by said container and indicating position changes, to determine the positions of the samples conveyed in said container, and updating accordingly said first marker memory.

15. A switching node for implementing a multiplexing process, in an asynchronous transfer mode telecommunication network, for time-division multiplexing data in asynchronous transfer mode cells of fixed length, each cell including:

a header containing a virtual circuit group identifier and a virtual circuit identifier that define a logical channel between two nodes of said network; and a payload made up of a fixed quantity of data;

said process comprising the steps of:

before routing data in one of said nodes, placing a payload in each of a series of cells supporting a same logical channel, wherein a series of logical entities, referred to as data containers, supports the same logical channel, each container including a load that is a quantity of data greater than that of the payload of each cell; and choosing a quantity of data conveyed by each container so that the use of said one node is more efficient; and to send samples of a plurality of signals from different circuits and to send data to different destinations, placing the following items in the series of containers supporting the same logical channel, each container having a fixed length:

samples respectively corresponding to said circuits, each sample being identifiable within a container by its position in said container; and a plurality of data packets each including a label indicating its length and its destination;

said switching node comprising:

- a main cell switching network having main inputs, constituting the inputs of said node, and main outputs constituting the outputs of said node; and
- at least one auxiliary cell switching network having inputs, respectively connected to auxiliary outputs of said main network, and outputs respectively connected to auxiliary inputs of said main network, in order to:
  - group in the same container, having a capacity greater than the payload of a cell, data contained in different cells, said data being routable over the same path for at least part of its routing in said node, and each container being conveyed by the series of cells supporting the same logical channel; and
  - place in separate cells, supporting respective different logical channels, data conveyed in the same cell because it was grouped in the same container; and said at least one auxiliary switching matrix comprising:

- a first marker memory dedicated to routing synchronous circuit samples;
- a first space switch controlled in accordance with data stored in the first marker memory to place synchronous circuit samples in a cell;
- a second marker memory dedicated to routing data packets; and
- a second space switch controlled in accordance with routing data stored in said second marker memory to place data packets in a cell.

* * * * *